United States Patent
On (10) Patent No.: US 10,007,291 B2
(45) Date of Patent: Jun. 26, 2018

(54) APPARATUS AND METHOD FOR PERFORMING DYNAMIC FREQUENCY CONTROL OF CENTRAL PROCESSING UNIT

(71) Applicant: ELECTRONICS AND TELECOMMUNICATIONS RESEARCH INSTITUTE, Daejeon (KR)

(72) Inventor: Jin-Ho On, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 154 days.

(21) Appl. No.: 15/159,958

(22) Filed: May 20, 2016

(65) Prior Publication Data

US 2017/0192450 A1 Jul. 6, 2017

(30) Foreign Application Priority Data

Jan. 4, 2016 (KR) ........................ 10-2016-0000669

(51) Int. Cl.
*G06F 1/00* (2006.01)
*G06F 1/08* (2006.01)
*G06F 9/48* (2006.01)
*G06F 9/50* (2006.01)
*G06F 13/24* (2006.01)
*G06F 1/32* (2006.01)

(52) U.S. Cl.
CPC .............. *G06F 1/08* (2013.01); *G06F 9/4825* (2013.01); *G06F 9/505* (2013.01); *G06F 13/24* (2013.01); *G06F 1/324* (2013.01); *G06F 1/3243* (2013.01)

(58) Field of Classification Search
CPC .......... G06F 1/324; G06F 1/3243; G06F 1/08; G06F 9/4825; G06F 9/505; G06F 13/24
See application file for complete search history.

(56) References Cited

U.S. PATENT DOCUMENTS

| 5,996,084 | A | * | 11/1999 | Watts | ........................ | G06F 1/08 713/322 |
| 9,350,348 | B1 | * | 5/2016 | Geng | .................... | H03K 5/1534 |
| 2011/0138195 | A1 | | 6/2011 | Kim et al. | | |
| 2013/0097453 | A1 | | 4/2013 | Choi et al. | | |

(Continued)

FOREIGN PATENT DOCUMENTS

| KR | 10-2013-0040485 A | 4/2013 |
| KR | 10-2015-0009823 A | 1/2015 |
| KR | 10-2015-0067869 A | 6/2015 |

*Primary Examiner* — Xuxing Chen
(74) *Attorney, Agent, or Firm* — LRK Patent Law Firm (57) ABSTRACT

An apparatus and method for performing the dynamic frequency control of a central processing unit (CPU). The apparatus for performing the dynamic frequency control of a central processing unit (CPU) includes a frequency setting unit, a latency measurement unit, a frequency adjustment unit, and a control unit. The frequency setting unit sets optimum frequency using the measured amount of load. The latency measurement unit measures scheduler execution information. The frequency adjustment unit adjusts the optimum frequency using the scheduler execution information. The control unit incorporates the adjusted optimum frequency into a CPU.

18 Claims, 6 Drawing Sheets

(56) References Cited

U.S. PATENT DOCUMENTS

2013/0246715 A1*  9/2013  Miyauchi ............... G06F 9/505
                                                  711/147
2015/0160714 A1   6/2015  Jun et al.

* cited by examiner

|  | Total | CPU 0 | CPU 1 | CPU 2 | CPU 3 |
| --- | --- | --- | --- | --- | --- |
| total_samples | 19437 | 15196 | 1563 | 1217 | 1461 |
| delays < 10 usecs | 9831 | 8039 | 704 | 467 | 621 |
| delays < 20 usecs | 976 | 545 | 134 | 132 | 165 |
| delays < 30 usecs | 381 | 239 | 55 | 43 | 44 |
| delays < 40 usecs | 386 | 247 | 48 | 42 | 49 |
| delays < 50 usecs | 37 | 26 | 2 | 6 | 3 |
| delays < 60 usecs | 7583 | 5930 | 598 | 504 | 551 |
| delays < 70 usecs | 111 | 70 | 10 | 12 | 19 |
| delays < 80 usecs | 131 | 99 | 12 | 11 | 9 |
| delays < 90 usecs | 1 | 1 | 0 | 0 | 0 |
| delays < 100 usecs | 0 | 0 | 0 | 0 | 0 |
| total < 100 usecs | 19437 | 15196 | 1563 | 1217 | 1461 |

FIG. 6

APPARATUS AND METHOD FOR PERFORMING DYNAMIC FREQUENCY CONTROL OF CENTRAL PROCESSING UNIT

CROSS-REFERENCE TO RELATED APPLICATION

This application claims the benefit of Korean Patent Application No. 10-2016-0000669, filed on Jan. 4, 2016, which is hereby incorporated by reference herein in its entirety.

BACKGROUND

1. Technical Field

The present disclosure relates generally to the dynamic frequency control of a central processing unit (CPU), and more particularly to technology that selects optimum operating frequency using latency information in order to reduce the energy, consumption of a CPU.

2. Description of the Related Art

With the advancement of informationization, power consumption in the field of Information Technology (IT) has rapidly increased year after year. In order to reduce the power consumption of IT devices, technology for monitoring power consumption for each device in real time, technology for controlling power, technology for automatically shutting off standby power, etc. have been developed.

In particular, in order to reduce the power consumption of a CPU, i.e., a core component of IT devices, CPU Dynamic Voltage and Frequency Scaling (DVFS) technology that controls frequency and voltage that are applied to the CPU has emerged. Furthermore, CPUIdle technology that controls a CPU in an idle state, i.e., a state in which substantially no tasks are being performed, has been developed.

According to technology for actually controlling the operating frequency of a CPU using DVFS, a CPU is driven at maximum operating frequency when the application load of the CPU is high, and the CPU is driven at lower operating frequency when the application load of the CPU is low.

Furthermore, Linux is in charge of the selection of the operating frequency of a CPU, and provides a governor, i.e., a module that changes the operating frequency of a CPU, using the DVFS interface of a BSP. Accordingly, the administrator of a system can guarantee an optimum execution state by selecting a specific governor according to the situation of the system.

Furthermore, the CPU DVFS governors of Linux include maximum frequency performance (Performance) type governors, minimum frequency performance (Powersave) type governors, load-based operating frequency selection (Ondemand, Conservative) type governors, etc. So far, various governors for mobile platforms have been proposed.

In particular, it is known that an average load information-based DVFS governor that has been proposed to overcome the problem of tasks that are asymmetrically executed in individual cores of a multicore CPU system has relatively optimum power efficiency. However, an additional algorithm is required for the average load information-based DVFS governor to select operating frequency for a maximum reduction in energy consumption through more accurate prediction.

A CPUFreq framework predicts future operating frequency using the state information of a system during a predetermined time. Although a conventional CPUFreq framework sets operating frequency using the load information of a system, the CPUFreq framework needs to set operating frequency based on various types of information in order to select a more accurate operating frequency.

Furthermore, the conventional CPUFreq framework and a conventional scheduler cannot collect information about the performance state of each other, and the CPUFreq framework cannot obtain information about the influence that is exerted on the scheduler due to a change in operating frequency.

Therefore, there is an urgent need for technology that selects optimum frequency while taking into account information generated during the performance of a scheduler as a frequency selection factor of a CPU DVFS governor.

In connection with this, Korean Patent Application Publication No. 10-2015-0067869 published on Jun. 19, 2015 discloses a technology related to "Dynamic Power Control Method in Multicore Environment."

SUMMARY

At least one embodiment of the present invention is directed to select optimum operating frequency, thereby maximizing the power efficiency of a system, unlike conventional technology that selects operating frequency using load information.

At least one embodiment of the present invention is intended to select optimum frequency for each core in a multicore CPU system, thereby effectively reducing power usage.

According to an aspect of the present invention, there is provided an apparatus for performing the dynamic frequency control of a central processing unit (CPU), the apparatus including: a frequency setting unit configured to set optimum frequency using the measured amount of load; a latency measurement unit configured to measure scheduler execution information; a frequency adjustment unit configured to adjust the optimum frequency using the scheduler execution information; and a control unit configured to incorporate the adjusted optimum frequency into a CPU.

The scheduler execution information may include at least one of the delay information of a scheduler and the delay information of interrupts.

The latency measurement unit may be further configured to compute a normalized numerical value by normalizing a difference value between the scheduler execution information and average scheduler execution information within a preset time interval.

The frequency adjustment unit may be further configured to adjust the optimum frequency to a first optimum frequency when the normalized numerical value is larger than a threshold value, and to adjust the optimum frequency to a second optimum frequency larger than the first optimum frequency when the normalized numerical value is smaller than the threshold value.

The delay information of a scheduler may refer to the number of context switches occurring within a preset delay time.

The delay information of interrupts may refer to the number of interrupts occurring within a preset delay time.

When frequency is set for each core, the frequency setting unit may be further configured to set the optimum frequency for each core using the amount of load for each core, and the frequency adjustment unit may be further configured to adjust the optimum frequency for each core using scheduler execution information for each core.

When an identical frequency is set for a plurality of cores, the frequency setting unit may be further configured to set the optimum frequency using the average value of the amounts of load for the plurality of cores, and the frequency adjustment unit may be further configured to adjust the optimum frequency using scheduler execution information for the plurality of cores.

The amount of load may be computed using the working time information and idle time information of a system.

The control unit may be further configured to make a setting so that the CPU maintains maximum frequency when received information about whether static frequency has been set corresponds to static frequency non-usage mode.

According to another aspect of the present invention, there is provided a method of performing the dynamic frequency control of a CPU that is performed by an apparatus for performing dynamic frequency control of a CPU; the method including: setting optimum frequency using the measured amount of load; measuring scheduler execution information; adjusting the optimum frequency using the scheduler execution information; and incorporating the adjusted optimum frequency into a CPU.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Embodiments of the present invention will be described in detail below with reference to the accompanying drawings. Redundant descriptions and descriptions of well-known functions and configurations that may make the gist of the present invention unnecessarily obscure will be omitted below. The embodiments of the present invention are intended to more completely describe the present invention to persons having ordinary knowledge in the art to which the present invention pertains. Accordingly, the shapes, sizes and the like of components in the drawings may be exaggerated to make the description obvious.

Embodiments of the present invention will now be described in detail with reference to the accompanying drawings below.

Figure 1:
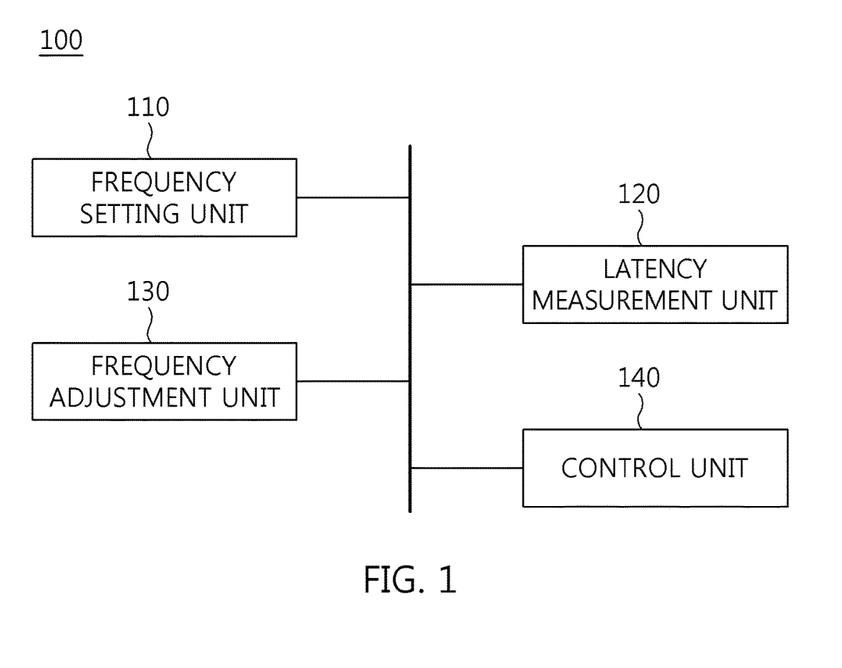
FIG. 1 is a block diagram showing the configuration of an apparatus for performing dynamic frequency control according to an embodiment of the present invention.

FIG. 1 is a block diagram showing the configuration of an apparatus 100 for performing dynamic frequency control according to an embodiment of the present invention.

As shown in FIG. 1, the apparatus 100 for performing dynamic frequency control includes a frequency setting unit 110, a latency measurement unit 120, a frequency adjustment unit 130, and a control unit 140.

First, the frequency setting unit 110 sets optimum frequency using the amounts of load for all cores measured during a predetermined period.

In this case, when frequency is set for each core, the frequency setting unit 110 may set optimum frequency for each core using the amount of load for each core. In contrast, when the same frequency is set for a plurality of cores, the frequency setting unit 110 may set optimum frequency using the average value of the amounts of load for the plurality of cores. In this case, the amount of load for the core may be computed using information, such as the working time and idle time of a system.

Thereafter, the latency measurement unit 120 measures scheduler execution information. In this case, the scheduler execution information includes at least one of the delay information of a scheduler and the delay information of interrupts.

Furthermore, the delay information of a scheduler refers to the number of context switches occurring within a preset delay time, and the delay information of interrupts refers to the number of interrupts occurring within a preset delay time.

Furthermore, the latency measurement unit 120 may compute a normalized numerical value by normalizing a difference value between scheduler execution information and average scheduler execution information within a preset time interval.

Furthermore, the frequency adjustment unit 130 adjusts optimum frequency using the scheduler execution information. Furthermore, the frequency adjustment unit 130 adjusts the optimum frequency to a first optimum frequency when the normalized numerical value is larger than a threshold value, and adjusts the optimum frequency to a second optimum frequency higher than the first optimum frequency when the normalized numerical value is smaller than the threshold value.

Furthermore, when frequency is set for each core, the frequency adjustment unit 130 adjusts optimum frequency for each core using scheduler execution information for the core. In contrast, when the same frequency is set for a plurality of cores, the frequency adjustment unit 130 adjusts optimum frequency using scheduler execution information for the cores.

Finally, the control unit 140 incorporates the adjusted optimum frequency into the CPU. Furthermore, the control unit 140 may receive information about whether static frequency has been set, and may perform dynamic frequency control according to an embodiment of the present invention when the received information about whether static frequency has been set corresponds to static frequency usage mode. In contrast, in the case of static frequency non-usage mode, the control unit 140 may make a setting so that the CPU maintains maximum frequency.

A method of performing the dynamic frequency control of a CPU according to an embodiment of the present invention is described in detail with reference to FIGS. 2 to 6 below.

Figure 2:
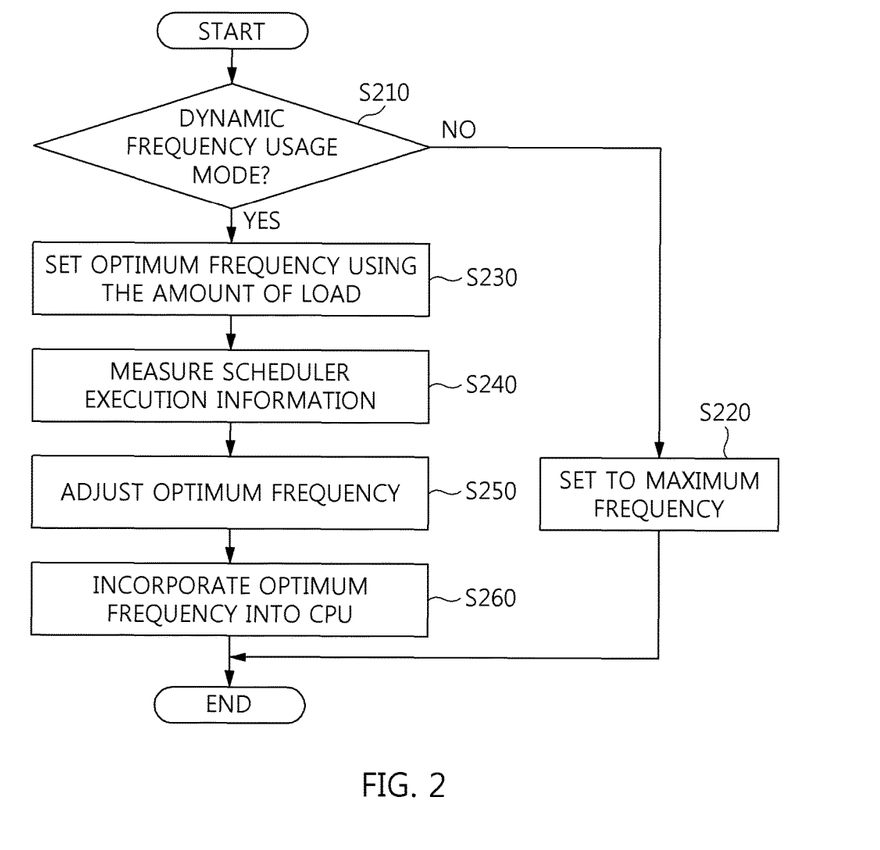
FIG. 2 is an operation flowchart showing a method of performing dynamic frequency control according to an embodiment of the present invention.

FIG. 2 is an operation flowchart showing the method of performing dynamic frequency control according to the present embodiment.

First, the apparatus 100 for performing dynamic frequency control determines whether current mode is static frequency usage mode at step S210.

In this case, whether current mode is static frequency usage mode may be received from a user, or may be determined by the apparatus 100 for performing dynamic frequency control using a preset condition and the current state of a system. Furthermore, in the case of dynamic frequency usage mode, the apparatus 100 for performing dynamic frequency control may variably set the operating frequency of a CPU using CPU DVFS.

Figure 3:
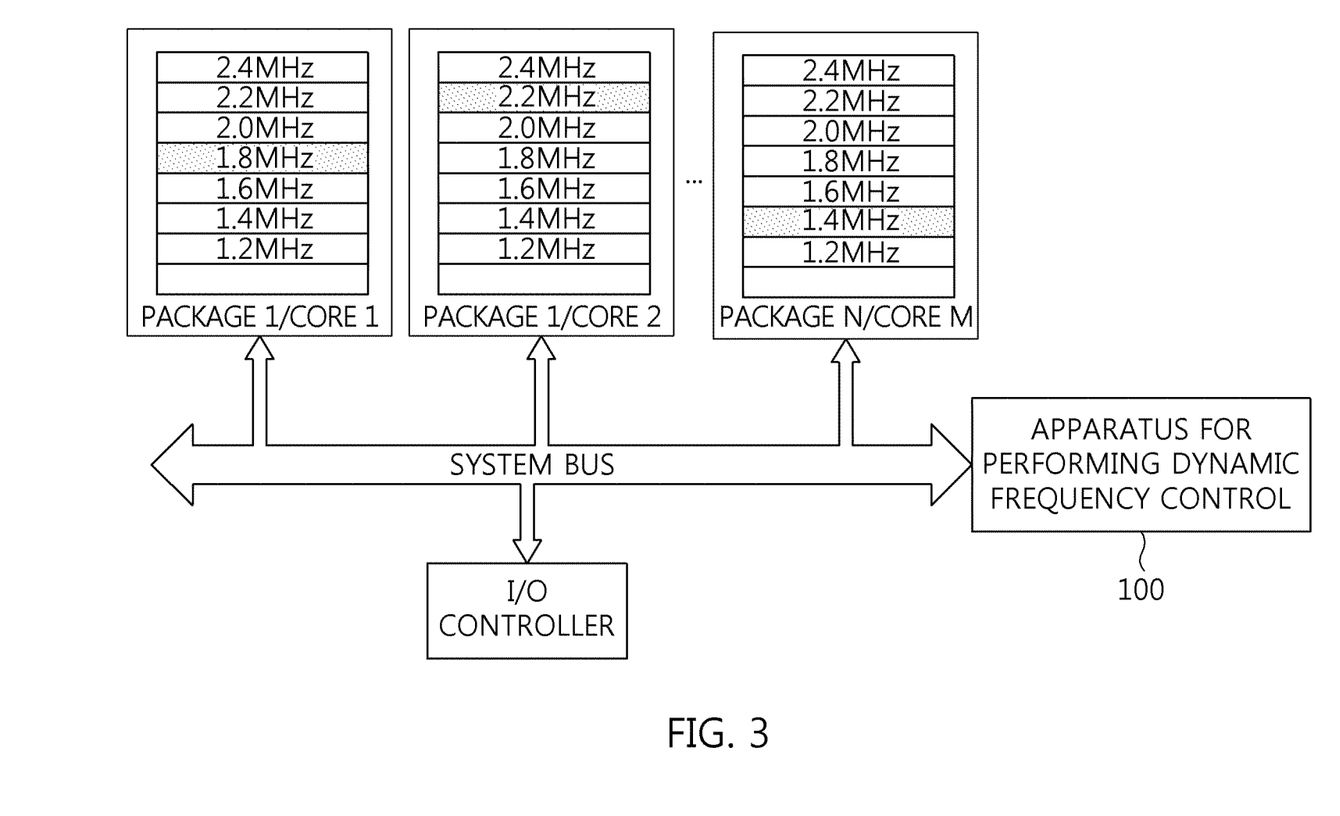
FIG. 3 is a diagram showing a hardware system to which an apparatus for performing dynamic frequency control according to an embodiment of the present invention is applied.

FIG. 3 is a diagram showing a hardware system to which an apparatus 100 for controlling dynamic frequency according to an embodiment of the present invention is applied.

As shown in FIG. 3, the hardware system to which the apparatus 100 for performing dynamic frequency control is applied is based on a multicore system including at least one package having at least one core. Furthermore, in the case of a CPU, it is possible to apply the CPU DVFS function of variably setting the operating frequency of the CPU in the kernel of an OS.

Furthermore, the operating frequency of core 1 may be set to 1.8 MHz, the operating frequency of core 2 may be set to 2.2 MHz, and the operating frequency of core 3 may be set to 1.4 MHz. That is, in the multicore system, the respective cores may be set to different operating frequencies.

In the case of static frequency non-usage mode, the apparatus 100 for performing dynamic frequency control makes a setting so that the CPU operates at maximum frequency at step S220.

In contrast, in the case of dynamic frequency usage mode, the apparatus 100 for performing dynamic frequency control sets optimum frequency using the amount of load at step S230.

Figure 4:
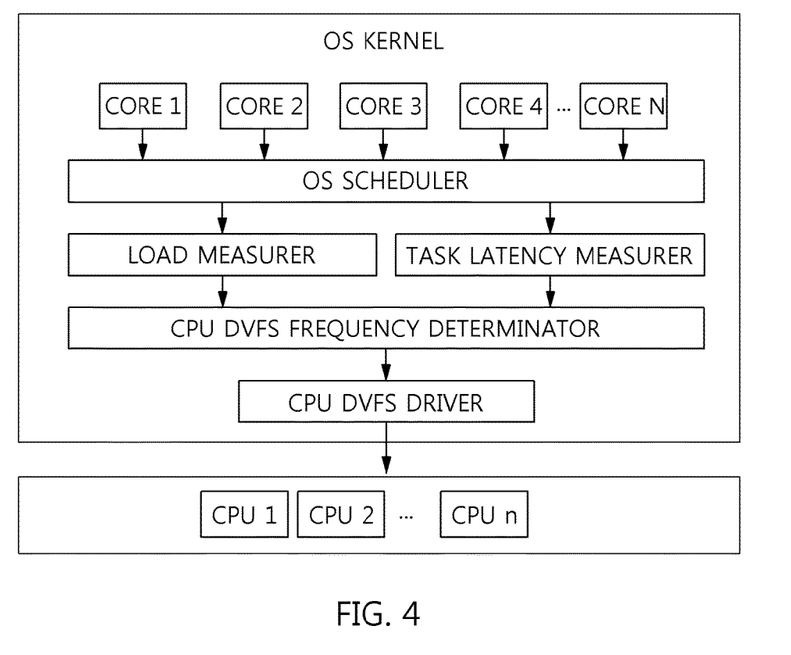
FIG. 4 is a diagram showing the system configuration of an apparatus for performing dynamic frequency control according to an embodiment of the present invention.

FIG. 4 is a diagram showing the system configuration of an apparatus for performing dynamic frequency control according to an embodiment of the present invention.

The apparatus 100 for performing dynamic frequency control sets optimum frequency using load information for each core measured by a load measurer shown in FIG. 4. In this case, the apparatus 100 for performing dynamic frequency control may set optimum frequency for each core, and may set the same optimum frequency for a plurality of cores.

In this case, the load information may be computed using the working time information and idle time information of a system, and the apparatus 100 for performing dynamic frequency control may set optimum frequency using load information during a predetermined time.

Thereafter, the apparatus 100 for performing dynamic frequency control measures scheduler execution information at step S240.

In this case, the scheduler execution information may include at least one of the delay information of a scheduler and the delay information of interrupts, and the scheduler execution information may be measured using a task latency measurer shown in FIG. 4.

Furthermore, the delay information of a scheduler refers to the number of context switches occurring within a preset delay time, and the delay information of interrupts refers to the number of interrupts occurring within a preset delay time.

Furthermore, the apparatus 100 for performing dynamic frequency control adjusts optimum frequency using the scheduler execution information at step S250.

The apparatus 100 for performing dynamic frequency control adjusts the scheduler execution information, measured at step S240, using the optimum frequency set at step S230.

Figure 5:
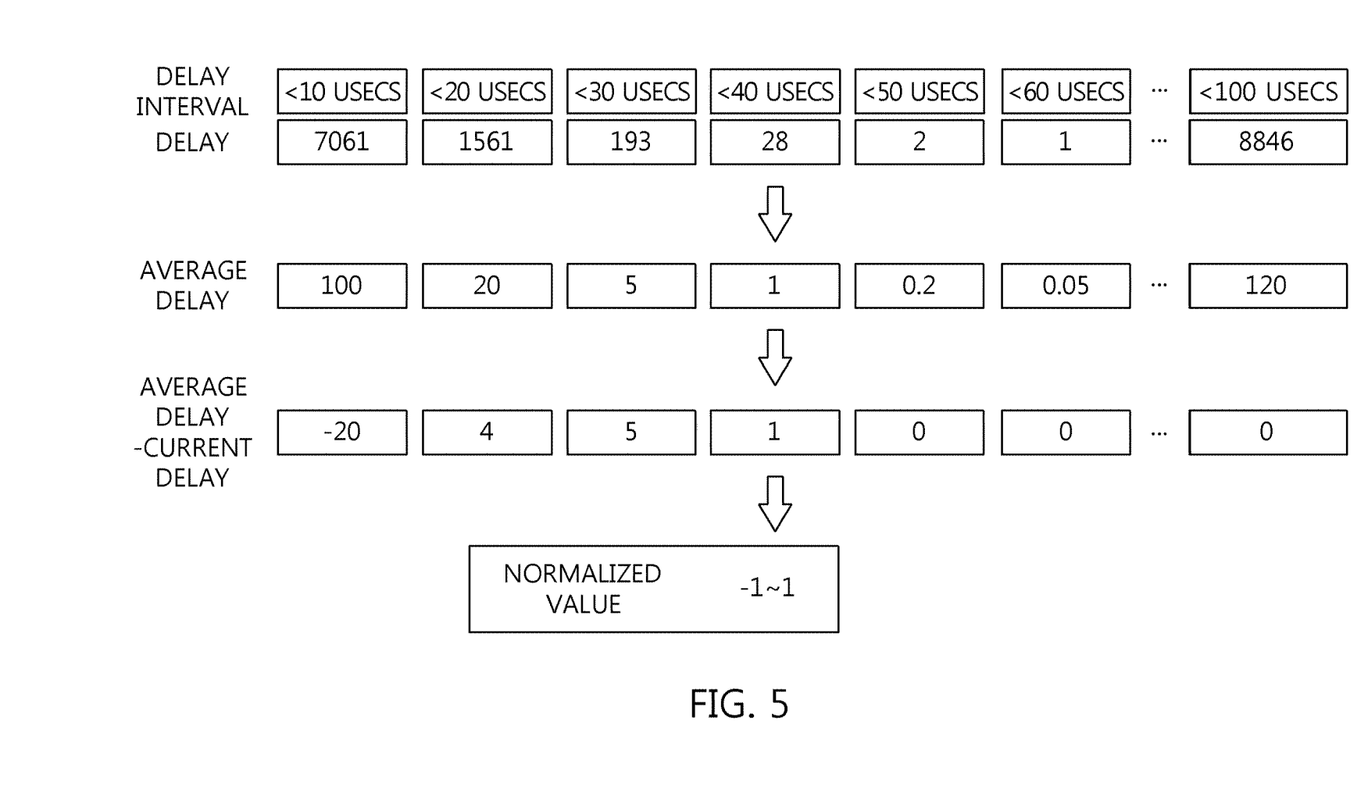
FIG. 5 is a diagram showing an algorithm for determining the current state of a scheduler according to an embodiment of the present invention.

FIG. 5 is a diagram showing an algorithm for determining the current state of a scheduler according to an embodiment of the present invention.

As shown in FIG. 5, the apparatus 100 for performing dynamic frequency control may determine the current execution state of a scheduler using the information of each delay interval.

In FIG. 5, the delay interval refers to a time interval, the delay refers to the number of delays occurring within each time interval in sampled information, and the average delay refers to the number of average delays occurring within a specific time interval.

Furthermore, the apparatus 100 for performing dynamic frequency control computes a difference value between the number of delays and the number of average delays in a specific time interval, and computes a normalized numerical value by normalizing the difference value. In this case, the normalized numerical value is represented by a value in the range from −1 to 1, in which case −1 means that the processing speed of a core is increasing, 0 means that the processing of a core is performed at the speed corresponding to the optimum average delay, and 1 means that the processing speed of a core is decreasing.

In this case, the apparatus 100 for performing dynamic frequency control may compute a single normalized numerical value using an average value obtained by integrating scheduler execution information corresponding to a plurality of cores, and may set the plurality of cores for a single adjusted optimum frequency value using the computed normalized numerical value.

Thereafter, the apparatus 100 for performing dynamic frequency control adjusts the optimum frequency, set at step S230, using the normalized numerical value. The apparatus 100 for performing dynamic frequency control may adjust the optimum frequency to lower frequency when the normalized numerical value is −1, and may adjust the optimum frequency to higher frequency when the normalized numerical value is 1.

In this case, the apparatus 100 for performing dynamic frequency control may adjust the optimum frequency using a preset adjustment range of optimum frequencies in accordance with the normalized numerical value, and may perform frequency adjustment using a CPU DVFS frequency determinator shown in FIG. 4.

Furthermore, the apparatus 100 for performing dynamic frequency control may compute the normalized numerical value using scheduler execution information for each core, and may adjust the optimum frequency for each core using the computed normalized numerical value.

Figure 6:
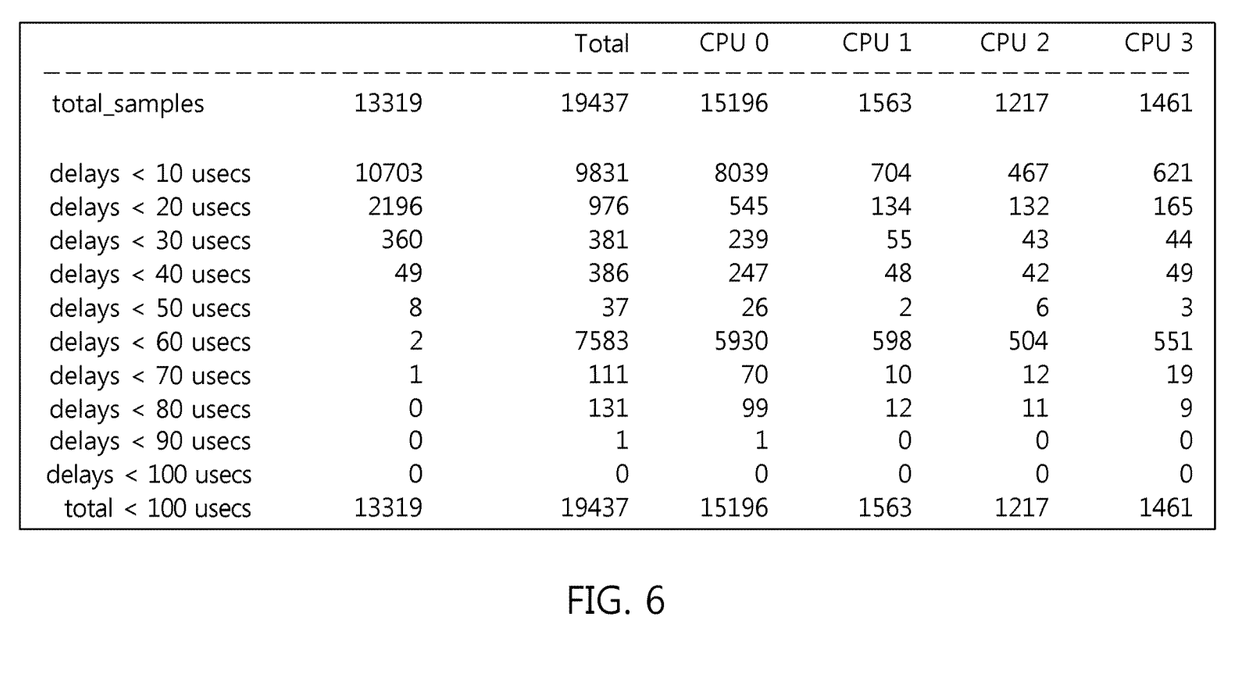
FIG. 6 is a diagram showing scheduler execution information according to an embodiment of the present invention.

FIG. 6 is a diagram showing scheduler execution information according to an embodiment of the present invention.

FIG. 6 shows scheduling and interrupt latency information identified using a latency command that is basically provided in BSD series. As shown in FIG. 6, the apparatus 100 for performing dynamic frequency control may measure delay information for each core. Furthermore, the apparatus 100 for performing dynamic frequency control may adjust optimum frequency for each core using a computed normalized numerical value for each core.

Finally, the apparatus 100 for performing dynamic frequency control incorporates the adjusted optimum frequency into the CPU at step S260.

In this case, the apparatus 100 for performing dynamic frequency control may incorporate the adjusted optimum frequency into the CPU using the CPU DVFS driver of FIG.

4. Furthermore, the CPU performs control so that each core operates at the adjusted optimum frequency.

At least one embodiment of the present invention has the advantage of selecting optimum operating frequency, thereby maximizing the power efficiency of a system, unlike conventional technology that selects operating frequency using load information.

At least one embodiment of the present invention has the advantage of selecting optimum frequency for each core in a multicore CPU system, thereby effectively reducing power usage.

The above-described apparatus and method for performing the dynamic frequency control of a CPU according to the present invention are not limited to the configurations and methods of the above-described embodiments, but some or all of the embodiments may be selectively combined such that the embodiments can be modified in various manners.

What is claimed is:

1. An apparatus for performing dynamic frequency control of a central processing unit (CPU), the apparatus comprising:
    a frequency setting unit configured to set an optimum frequency using a measured amount of load;
    a latency measurement unit configured to measure scheduler execution information;
    a frequency adjustment unit configured to adjust the optimum frequency using the scheduler execution information; and
    a control unit configured to incorporate the adjusted optimum frequency into a CPU,
    wherein the latency measurement unit is further configured to compute a normalized numerical value by normalizing a difference value between the scheduler execution information and average scheduler execution information within a preset time interval.

2. The apparatus of claim 1, wherein the scheduler execution information comprises at least one of delay information of a scheduler and delay information of interrupts.

3. The apparatus of claim 1, wherein the frequency adjustment unit is further configured to:
    adjust the optimum frequency to a first optimum frequency when the normalized numerical value is larger than a threshold value, and
    adjust the optimum frequency to a second optimum frequency larger than the first optimum frequency when the normalized numerical value is smaller than the threshold value.

4. The apparatus of claim 2, wherein the delay information of a scheduler refers to a number of context switches occurring within a preset delay time.

5. The apparatus of claim 2, wherein the delay information of interrupts refers to a number of interrupts occurring within a preset delay time.

6. The apparatus of claim 1, wherein when frequency is set for each core:
    the frequency setting unit is further configured to set the optimum frequency for each core using an amount of load for each core; and
    the frequency adjustment unit is further configured to adjust the optimum frequency for each core using scheduler execution information for each core.

7. The apparatus of claim 1, wherein when an identical frequency is set for a plurality of cores:
    the frequency setting unit is further configured to set the optimum frequency using an average value of amounts of load for the plurality of cores; and
    the frequency adjustment unit is further configured to adjust the optimum frequency using scheduler execution information for the plurality of cores.

8. The apparatus of claim 1, wherein the amount of load is computed using working time information and idle time information of a system.

9. The apparatus of claim 1, wherein the control unit is further configured to make a setting so that the CPU maintains maximum frequency when received information about whether a static frequency has been set corresponds to a static frequency non-usage mode.

10. A method of performing dynamic frequency control of a central processing unit (CPU) that is performed by an apparatus for performing dynamic frequency control of a CPU, the method comprising:
    setting an optimum frequency using a measured amount of load;
    measuring scheduler execution information;
    computing a normalized numerical value by normalizing a difference value between the scheduler execution information and average scheduler execution information within a preset time interval;
    adjusting the optimum frequency using the scheduler execution information; and
    incorporating the adjusted optimum frequency into a CPU.

11. The method of claim 10, wherein the scheduler execution information comprises at least one of delay information of a scheduler and delay information of interrupts.

12. The method of claim 10, wherein adjusting the optimum frequency comprises:
    adjusting the optimum frequency to a first optimum frequency when the normalized numerical value is larger than a threshold value, and
    adjusting the optimum frequency to a second optimum frequency larger than the first optimum frequency when the normalized numerical value is smaller than the threshold value.

13. The method of claim 11, wherein the delay information of a scheduler refers to a number of context switches occurring within a preset delay time.

14. The method of claim 11, wherein the delay information of interrupts refers to a number of interrupts occurring within a preset delay time.

15. The method of claim 10, wherein when frequency is set for each core:
    setting the optimum frequency comprises setting the optimum frequency for each core using an amount of load for each core; and
    adjusting the optimum frequency comprises adjusting the optimum frequency for each core using scheduler execution information for each core.

16. The method of claim 10, wherein when an identical frequency is set for a plurality of cores:
    setting the optimum frequency comprises setting the optimum frequency using an average value of amounts of load for the plurality of cores; and
    adjusting the optimum frequency comprises adjusting the optimum frequency using scheduler execution information for the plurality of cores.

17. The method of claim 10, wherein the amount of load is computed using working time information and idle time information of a system.

18. The method of claim 10, further comprising receiving information about whether a static frequency has been set, wherein a setting is made such that the CPU maintains maximum frequency when the received information about whether the static frequency has been set corresponds to a static frequency non-usage mode.

\* \* \* \* \*